July 22, 1958     J. YEGLINSKI     2,843,904

SAFETY PIN

Filed May 4, 1956

INVENTOR.
JOSEPH YEGLINSKI
BY L. S. Michelman
atty.

United States Patent Office 2,843,904
Patented July 22, 1958

2,843,904
SAFETY PIN

Joseph Yeglinski, Greenfield, Mass.

Application May 4, 1956, Serial No. 582,845

1 Claim. (Cl. 24—156)

This invention is concerned with safety pins; and more particularly, a more safety pin that has a safety feature both in a closed and open position. Most of the safety pins which presently exist have dangerous factors that have not been overcome. Particularly is it desirous to have a safety pin that can be used without concern, in the true sense of safety, in pinning up of the diapers of a baby. There are, of course, many other such uses where the degree of safety is extremely high and important.

It is an object of the within invention to provide a safety pin that has safety features both in the closed and the open position.

It is another object of the within invention to provide a safety pin that has safety features, and which can still be manufactured at a low cost.

It is yet another object of the within invention to provide a safety pin that has a self-biasing spring which prevents the movable point from extending beyond a shield which is affixed to the head of the pin.

It is an additional object of the within invention to provide a safety pin that is reliable, endurable, strong, readily and easily manipulated.

It is yet an additional object of the within invention to provide a safety pin that is actually safe, and which will not cause injury if swallowed by a child, and which is unlikely to be loosened from the clothing or wearing apparel; or, if it is, will not stick into the person wearing the garment.

These and other objects are obtained by the use of a safety pin which is in the general shape of conventional safety pins, but which has certain important improvements and features of detail. A spring coil is formed at the bottom of the pin by the fixed and movable arms, which are, in fact, a uintary continuous tension wire. The spring is formed by two coils which are at an inclined angle to the plane of the arms, which inclined angle feature brings about the desired bias on the movable arm. There is a head which has a natural shape for shielding and concealing the point of the pin on the movable arm. There is a contour which is like a track and enables the user of the pin to close the movable arm evenly and without any chance of injury or without any extra effort.

These and other objects will be apparent from the following detailed description, when taken with the accompanying drawing, in which.

Figure 1:
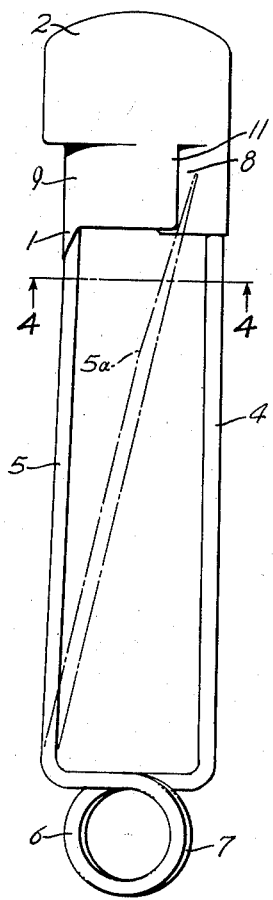
Figure 1 is a front elevational view of the safety pin described herein.

The more safety pin comprises a head 2, which has an indentation at 9 above a retaining flange 1. The shape of the upper part of the head is semi-circular or streamlined, so as not to bind on the garments when in use. The back portion of the head 2 is the rear 3, which is hollow, and has inserted therein and soldered or secured thereto, a fixed immovable arm 4. The fixed arm 4 and the movable arm 5, are actually an integral piece of steel, having spring tension characteristics. The arm 4 is coiled at the bottom, as at 6 and 7, into a double rolled or coiled spring. The rolls of the spring 6 and 7 are at an angle to the plane of the fixed arm 4 and the movable arm 5.

The structure of the head 2 has many details which are extremely important. There is a ridge 12 which separates the upper portion of the head 2 from the lower portion 9, which lower portion 9 is indented from the upper portion 2, as will be hereinafter explained. There is also, on lower portion 9, a retaining flange 1, which assists in holding the pin end of the movable arm 5 in locked position.

Figure 4:
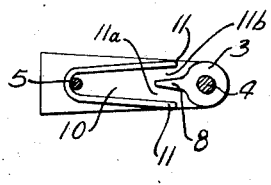
Figure 4 is a view of the head of the pin taken along line 4—4 of Figure 1.

Reference is made to the view of Figure 4, which shows the head 2 of the pin to be hollow inside, by the area indicated as 10. Within the area 10 is an extrusion or, perhaps, it would be better to refer to it as a locking surface 8, which can be seen also in Figure 1. This locking surface 8 divides the opening area 10 into two parts, out of which the movable arm 5 may be moved.

It is also to be noted in the view of Figure 4, that the fixed arm 4 is secured on the right hand side of the head to the rear 3. The edge of the indentation 9 terminates at a point indicated as 11, leaving two open areas between the end of the locking surface 8 and its end 11, which areas are indicated as 11a and 11b. It is through the areas 11a and 11b that the movable pin 5 may be pushed in order to disengage the pin from the head 2. In order to show this maneuver, a dotted line indicated as movable arm 5a is shown in Figure 1 and Figure 4.

Once the arm 5 has been moved through either the opening 11a or 11b from the main opening 10, it will automatically follow the contour of the ridge 12 and stop under the bias of the coil spring 6 and 7 beneath the head 2 and along the indentation 9. This is shown clearly in Figure 5. In order for the movable arm 5 to be moved out from the head 2 and away from the indentation 9, it is necessary for the user to exert a pressure against the tension of the coil spring 6, 7.

Figure 5:
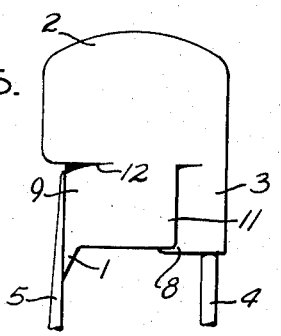
Figure 5 is a portion of a front elevational view of the pin, showing the movable arm in the outside open position.

In operation, the pin is connected to clothing or wearing apparel in the conventional way. The movable arm 5 must be in open position, as shown in Figure 5, and must then be pushed away from the head 2 to engage the clothing. Once this is done, the movable arm 5 is pushed along the contour of the head 2, around the area 12, and into the openings 11a or 11b, whereby it is snapped into the position shown in Figure 1 and Figure 4, under the tension of the spring 6, 7.

Figure 2:
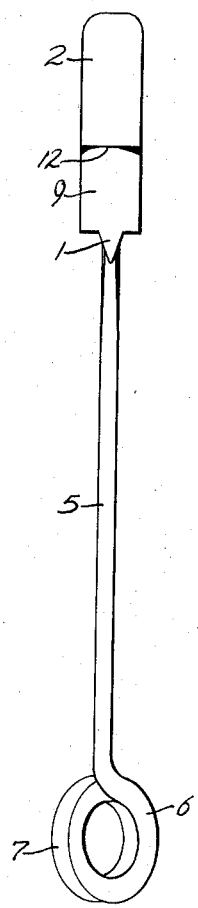
Figure 2 is a side elevational view, looking towards the left side of Figure 1.
Figure 3:
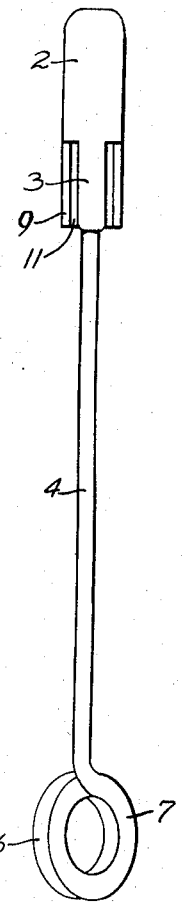
Figure 3 is a side elevational view, looking towards the right side of Figure 1.

The spring 6, 7 is really an equilibrium biasing spring because in equilibrium, the arm 5 is located exactly in the position as shown in Figure 1 and Figure 4. In other words, it is not normal for the arm 5 to be in any other position under the tension of the said spring 6, 7. This spring obtains this result by being at an angle to the plane of the two arms, 4 and 5. The angle is determined by the size, length and strength of the steel used in the spring. In the embodiment shown, the angle is forty-five (45°) degrees, as can be clearly seen in the views of Figure 2 and Figure 3.

It is to be noted that the retaining flange 1, because of its V shape, acts as a lock and prevents the pin from coming loose when the arm 5 is in its open position of Figure 5. The shape of flange 1 must be designed so as to bind against the garment to which the pin is attached. It could be circular or round as well as V shaped, so long as it binds against the garment when arm 5 is in the open position.

Dimensions in the drawings have been exaggerated to teach the within invention more clearly.

In consideration of the foregoing description and disclosure,

I claim:

A safety pin comprising a head assembly having a recessed portion along the lower surface of said head and on each side thereof, said head having an indented portion in the rear of said head and a guard extending downwardly from a portion of the head assembly and at right angles thereto and on both sides of said head assembly, a V-shaped retaining flange extending downwardly from the said guard portion and directly beneath the recessed portion, said guard having a groove therein proximate the indented area, a fixed immovable arm extending from said head from within said indented area, a coiled spring formed at the bottom of said immovable arm, said spring having two complete turns therein, a movable arm member extending upwardly from said spring, said spring being at an angle to the plane of the two arms, said angle being of a size that enables the movable arm to be in contact with the V-shaped flange when the said movable arm is both locked and unlocked, said movable arm being movable against the bias of the spring on either side of said indented portion from within said recessed portion, whereby said movable arm may be unlocked or locked within the head.

References Cited in the file of this patent
UNITED STATES PATENTS

| | | |
|---|---|---|
| 1,099,650 | Houghton | June 9, 1914 |
| 2,604,681 | Van Dusen et al. | July 29, 1952 |
| 2,748,438 | Clark | June 5, 1956 |

FOREIGN PATENTS

| | | |
|---|---|---|
| 301,087 | Switzerland | Nov. 1, 1954 |